United States Patent
Zeng et al.

(10) Patent No.: US 10,674,508 B2
(45) Date of Patent: Jun. 2, 2020

(54) USER EQUIPMENT OPERATING MODE CONTROL

(71) Applicant: Huawei Technologies Co., Ltd., Shenzhen (CN)

(72) Inventors: Qinghai Zeng, Shanghai (CN); Kelvin Kar Kin Au, Kanata (CA); Mohammadhadi Baligh, Ottawa (CA); Jianglei Ma, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 75 days.

(21) Appl. No.: 15/192,242

(22) Filed: Jun. 24, 2016

(65) Prior Publication Data

US 2017/0318584 A1 Nov. 2, 2017

Related U.S. Application Data

(63) Continuation of application No. PCT/CN2016/080515, filed on Apr. 28, 2016.

(51) Int. Cl.
*H04W 72/04* (2009.01)
*H04W 52/02* (2009.01)
(Continued)

(52) U.S. Cl.
CPC ......... *H04W 72/0453* (2013.01); *H04J 11/00* (2013.01); *H04L 1/0018* (2013.01); *H04L 43/16* (2013.01); *H04W 40/005* (2013.01); *H04W 52/02* (2013.01); *H04W 72/042* (2013.01); *H04W 72/0413* (2013.01); *H04W 72/1226* (2013.01); *H04W 72/14* (2013.01);
(Continued)

(58) Field of Classification Search
USPC .......................................................... 370/329
See application file for complete search history.

(56) References Cited

U.S. PATENT DOCUMENTS 9,743,423 B2 * 8/2017 Liu .................. H04L 1/0003
9,769,793 B2 * 9/2017 Zarifi ................ H04W 68/02
(Continued)

FOREIGN PATENT DOCUMENTS

| CN | 102958141 A | 3/2013 |
|---|---|---|
| CN | 105340355 A | 2/2016 |
| WO | 2017114264 A1 | 7/2017 |

*Primary Examiner* — Edan Orgad
*Assistant Examiner* — Emmanuel K Maglo
(74) *Attorney, Agent, or Firm* — Slater Matsil, LLP (57) ABSTRACT

A notification regarding a transition of a User Equipment (UE) from a standby operating mode to an active operating mode is exchanged between a UE and a network element in a communication network. The notification could be an uplink notification that is transmitted by the UE to the network element in response to an operating mode transition criterion for the UE being met at the UE, or a downlink notification that is transmitted by the network element to the UE in response to an operating mode transition criterion for the UE being met at the network element. The UE transitions from the standby operating mode to the active operating mode in response to the operating mode transition criterion being satisfied. The transmitter of the notification, which could be the UE or the network element, could also perform grant-free transmission of data without first receiving a response to the notification.

24 Claims, 7 Drawing Sheets

(51) Int. Cl.
*H04W 76/27* (2018.01)
*H04J 11/00* (2006.01)
*H04L 1/00* (2006.01)
*H04L 12/26* (2006.01)
*H04W 40/00* (2009.01)
*H04W 72/12* (2009.01)
*H04W 72/14* (2009.01)
*H04W 88/02* (2009.01)

(52) U.S. Cl.
CPC ........ *H04W 76/27* (2018.02); *H04W 52/0229* (2013.01); *H04W 52/0235* (2013.01); *H04W 88/02* (2013.01); *Y02D 70/1262* (2018.01); *Y02D 70/24* (2018.01)

(56) References Cited

U.S. PATENT DOCUMENTS

| | | |
|---|---|---|
| 2007/0053315 A1 | 3/2007 | Sugaya |
| 2013/0265922 A1* | 10/2013 | Chakravarthy ... H04W 52/0212 370/311 |
| 2014/0016592 A1* | 1/2014 | Huang ................ H04W 72/042 370/329 |
| 2014/0068243 A1* | 3/2014 | Li ............................ G06F 3/00 713/100 |
| 2014/0074907 A1* | 3/2014 | Soliman ................ H04W 28/14 709/203 |
| 2014/0192767 A1* | 7/2014 | Au .................... H04W 72/0413 370/330 |
| 2014/0204800 A1* | 7/2014 | Moulsley .............. H04L 5/0023 370/254 |
| 2015/0117342 A1* | 4/2015 | Loehr ............... H04W 72/1284 370/329 |
| 2015/0156793 A1* | 6/2015 | Dai ................... H04W 72/1242 370/329 |
| 2015/0195788 A1 | 7/2015 | Au et al. |
| 2015/0256308 A1 | 9/2015 | Ma et al. |
| 2015/0271755 A1 | 9/2015 | Karri et al. |
| 2016/0227481 A1* | 8/2016 | Au .................... H04W 52/0209 |
| 2016/0353453 A1* | 12/2016 | Au ...................... H04W 74/006 |
| 2017/0034845 A1* | 2/2017 | Liu .................... H04L 1/0003 |
| 2017/0257195 A1* | 9/2017 | Maaref ................... H04L 1/189 |
| 2018/0167161 A1* | 6/2018 | Davydov ............... H04L 1/0001 |

\* cited by examiner

USER EQUIPMENT OPERATING MODE CONTROL

CROSS-REFERENCE TO RELATED APPLICATIONS

This application is a Continuation of PCT Application No. PCT/CN2016/080515, filed on Apr. 28, 2016, which application is hereby incorporated herein by reference.

TECHNICAL FIELD

The present disclosure relates generally to wireless communications and, in particular, to controlling operating modes of User Equipment (UE).

BACKGROUND

UEs in a wireless communication system may have multiple operating modes, including an active operating mode and a standby operating mode. In an active operating mode, all UE functions are available, and the UE may be transmitting or receiving communication signals or otherwise being used by a user, for example. A standby operating mode in which at least some UE functions are disabled could be useful for conserving power.

In current $3^{rd}$ Generation Partnership Project (3GPP) Long Term Evolution (LTE) systems, for example, UEs have a Radio Resource Control (RRC) idle mode. When downlink (DL) data is to be transmitted to a UE by a network element in a communication system or uplink (UL) data is to be transmitted by a UE to a network element, the UE must transition from the RRC idle mode to an RRC connected mode before data transmission begins.

SUMMARY

UE operating mode transitions from a standby operating mode to an active operating mode take time, which introduces latency in a communication system. Latency is especially problematic in communication systems that handle delay-sensitive data. Reducing the amount of time associated with standby-to-active UE operating mode transitions impacts overall latency, and can improve communication system performance.

According to embodiments disclosed herein, a notification regarding a transition of a UE from a standby operating mode to an active operating mode is exchanged between a UE and a network element in a communication network. The notification could be a UL notification that is transmitted by the UE to the network element in response to an operating mode transition criterion for the UE being met at the UE, or a DL notification that is transmitted by the network element to the UE in response to an operating mode transition criterion for the UE being met at the network element. In some embodiments, both types of notifications are supported.

For a UL notification, the operating mode transition criterion could be associated with data that is to be transmitted from the UE. Such a criterion could be satisfied when an amount of data that is to be transmitted meets or exceeds a threshold, for example. Another data-related operating mode transition criterion relates to an amount of data that is expected to be received by the UE meeting or exceeding a threshold.

In one embodiment, a method performed by a UE involves transmitting a UL notification to a network element in response to an operating mode transition criterion for the UE being satisfied, and also transitioning the UE from the standby operating mode to the active operating mode in response to the operating mode transition criterion being satisfied. A UE could include a transmitter to transmit the notification and a mode controller, coupled to the transmitter, to transition the UE from the standby operating mode to the active operating mode.

The network element could also or instead monitor a UE operating mode transition criterion, such as a criterion associated with data that is to be transmitted from the network element to the UE. Arrival of data at the network element for transmission to the UE, for example, is illustrative of a UE operating mode transition criterion that could be satisfied at the network element, to trigger transmission of a DL notification from the network element to the UE.

The UE, the network element, or both, could also perform grant-free transmission of data without first receiving a response to the UL or DL notification. For example, when a data-related operating mode transition criterion is satisfied, all or part of the data that satisfied the criterion could be transmitted by the UE or the network element before a response to the notification is received. The notification transmission and a grant-free data transmission are simultaneous in some embodiments.

Data transmission in the DL direction, the UL direction, or both, could subsequently move to scheduled transmission, after one or more grant-free transmissions have been completed. In the case of UL communications, for example, a network element receiver receives the UL notification from the UE, to notify the network element that a UE operating mode transition criterion is satisfied. A transmitter at the network element may then transmit to the UE a grant of communication resources for use by the UE in transmitting data to the network element.

A grant of communication resources could be in accordance with an adaptive communication scheme in embodiments in which the UE transmits information such as Channel State Information (CSI) to the network element. A channel state monitor could be implemented at the UE to measure communication channel state at the UE, for example. A transmitter that also transmits the UL notification, and may perform grant-free data transmissions in some embodiments, could be further configured to transmit CSI, in accordance with the measured communication channel state, to the network element.

Other aspects and features of embodiments of the present disclosure will become apparent to those ordinarily skilled in the art upon review of the following description.

BRIEF DESCRIPTION OF THE DRAWINGS

Embodiments of the invention will be described in greater detail with reference to the accompanying drawings.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Turning now to the figures, some specific example embodiments will be described.

Figure 1:
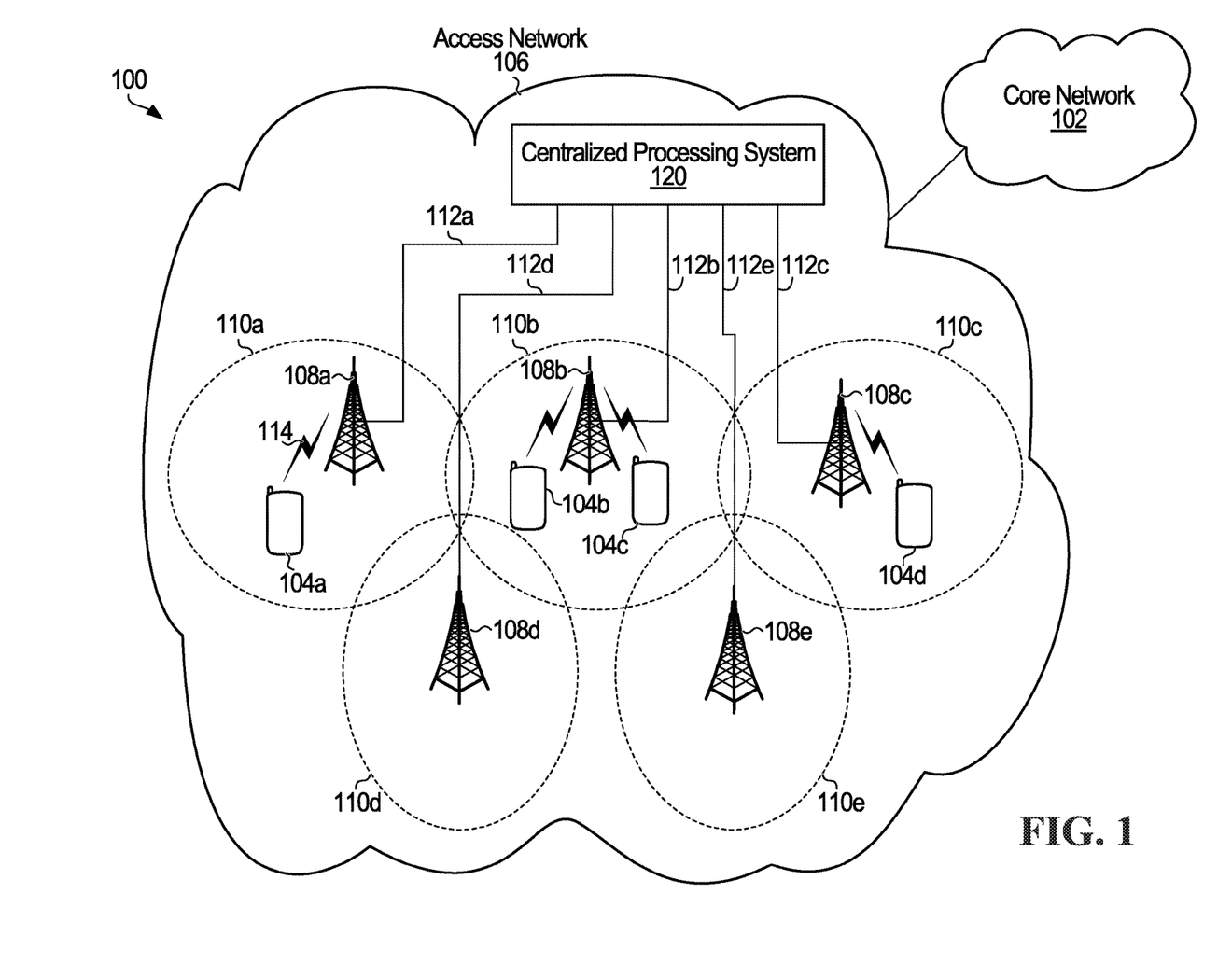
FIG. 1 is a block diagram illustrating a communication system in accordance with one embodiment.

FIG. 1 is a diagram illustrating a communication system in accordance with one embodiment. The communication system 100 includes a core network 102 and an access network 106.

The core network 102 may provide any of various services, such as call control/switching and gateways to other networks. The core network 102 includes network components such as routers, switches, and servers.

The access network 106 is a wireless communication network, and is connected or coupled to the core network 102. The network elements or nodes 108a, 108b, 108c, 108d, 108e provide wireless communication service within respective wireless coverage areas 110a, 110b, 110c, 110d, 110e. Each network element 108a-e may be implemented using a radio transceiver, one or more antennas, and associated processing circuitry, such as antenna radio frequency (RF) circuitry, analog-to-digital/digital-to-analog converters, etc. Base stations, transmit points (TPs), and evolved NodeBs (eNBs) are examples of the network elements 108a-e.

UEs 104a, 104b, 104c, 104d wirelessly access the communication system 100 using the access network 106. Each UE 104a-d includes a radio transmitter and a radio receiver which may be integrated into a radio transceiver, one or more antennas, and associated processing circuitry, such as antenna radio frequency (RF) circuitry, analog-to-digital/digital-to-analog converters, etc. The network elements 108-e and the UEs 104a-d may include similar types of components to support communications with each other in the communication system 100, but the actual implementations may be different. For example, the UEs 104a-d are portable between locations, whereas the network elements 108a-e are typically intended to be installed at a fixed location.

The network elements 108a-e are connected to a centralized processing system 120 in the access network 106, via respective communication links 112a, 112b, 112c, 112d, 112e. Each communication link 112a-e is an optical fibre communication link in one embodiment. Each network element 108a-e includes circuitry for transmitting data to the centralized processing system 120 and for receiving data from the centralized processing system via its respective communication link 112a-e. Although shown as a single centralized processing system in FIG. 1, the centralized processing system 120 may be implemented by a network of one or more processing and control servers. Alternatively, the centralized processing system 120 may be implemented as a single server.

The network elements 108a-e may serve as a gateway between wireline and wireless portions of the access network 106, although this need not be the case in embodiments in which the communication links 112a-e are wireless links. The network elements 108a-e may be placed at fixed locations by a network provider, for example, to provide a substantially continuous wireless coverage area. This is shown in FIG. 1 in that wireless coverage areas 110a-e overlap each other so that the UEs 104a-d may move throughout the wireless coverage areas and still be served by the access network 106.

Under certain conditions, a UE 104a-d could transition to and remain in a standby operating mode. For example, a UE 104a-d could transition to a standby operating mode after a time period of inactivity, during which limited communication signals were received or transmitted by the UE and the UE was not otherwise in use by a user. The UE 104a-d could transition to a standby operating mode after a time period of reduced activity, or activity below a threshold level. The standby operating mode allows the UE to conserve battery power and thereby extend battery life. Although limited communication functions may be supported in the standby operating mode, a UE 104a-d transitions from the standby operating mode to the active operating mode before full communication functions are restored.

Figure 2:
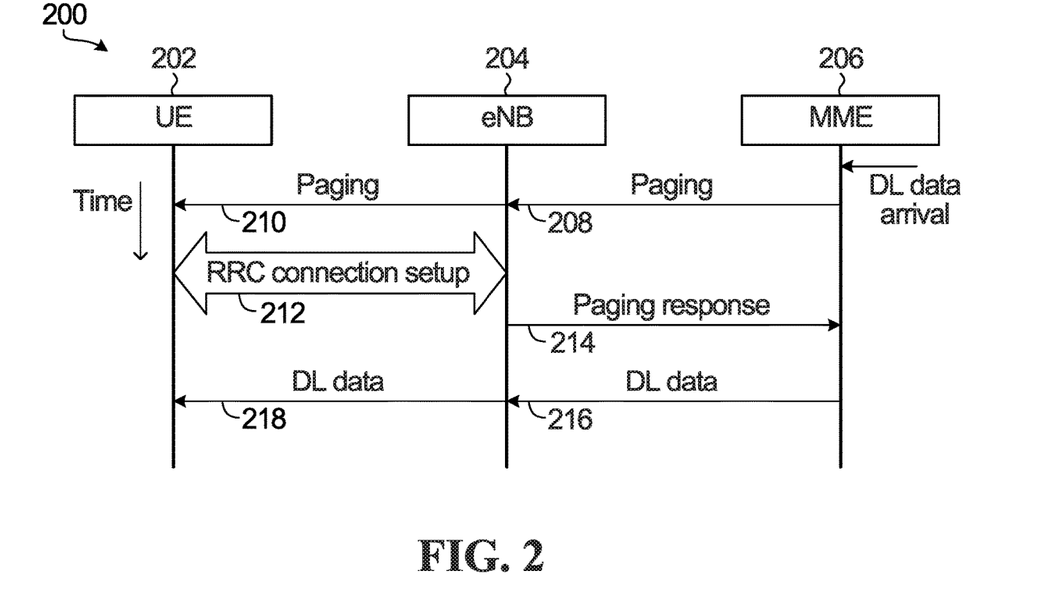
FIGS. 2 and 3 are message passing diagrams that illustrate signalling and operations involved in conventional standby-to-active UE operating mode transitions.
Figure 3:
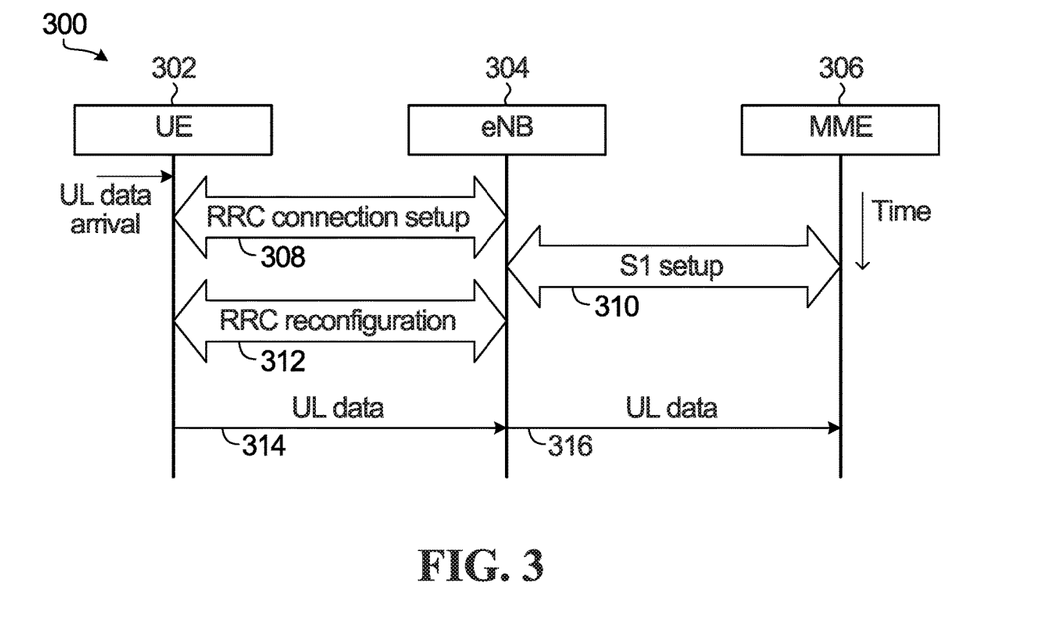

FIGS. 2 and 3 are message passing diagrams that illustrate signalling and operations involved in conventional standby-to-active UE operating mode transitions. The message passing diagrams 200, 300 in FIGS. 2 and 3 include a UE 202, 302 an eNB 204, 304, and a Mobility Management Entity (MME) 206, 306. The MME 206 is an example of a network controller in LTE systems.

Referring to FIG. 2, in the message passing diagram 200, the MME 206 sends a paging message 208 to the eNB 204 when the MME receives DL data that is to be transmitted to the UE 202, which is in a standby operating mode. The eNB 204 relays the paging message to the UE 202 at 210. The UE then initiates an RRC connection setup procedure with the eNB 204 at 212. A paging response is transmitted by the eNB 204 to the MME 206 at 214. The MME 206 then transmits the DL data to the eNB 204 as shown at 216, and the DL data is transmitted from the eNB to the UE 202 as shown at 218. The paging, RRC connection setup, and paging response procedures shown in FIG. 2 introduce latency between the DL data arrival and transmission of the DL data at 216, 218. The latency introduced by the paging, RRC connection setup, and paging response procedures is typically more than 50 milliseconds, and can be as high as several hundred milliseconds, which may not be acceptable for some applications.

Referring to FIG. 3, the message passing diagram 300 relates to UL data arrival at the UE 302, which is in a standby operating mode. UL data arrival refers arrival of data at a protocol layer or component of the UE 302 that is responsible for determining that the data is to be transmitted. The RRC connection setup procedure 308 is initiated by the UE 302. The eNB 304 initiates an S1 setup procedure with the MME 306 at 310. An RRC reconfiguration procedure may also be executed between the eNB 304 and the UE 302, as shown at 312. The UL data is transmitted from the UE 302 to the eNB 304 at 314, and from the eNB to the MME 306 at 316. The RRC connection setup procedure at 308, the S1 setup procedure at 310, and the RRC reconfiguration procedure at 312 introduce latency between the UL data arrival and transmission of the UL data at 314, 316. The latency introduced by these procedures 308, 310, 312 is more than 50 milliseconds, and normally reaches several hundred milliseconds.

In accordance with embodiments disclosed herein, in the standby operating mode a UE maintains an identifier and transmits tracking information to a network element. For example, the identifier could be a UE Dedicated Connection ID (DCID), which is assigned to the UE. The "ECO" state disclosed in United States Patent Application Publication No.: U.S. 2015/0195788 A1 is an example of a standby operating mode, in which a UE maintains an identifier.

At least some degree of connectivity to a network element is supported in the UE standby operating mode, so that UE is able to maintain its DCID and its connection to the wireless communication network. If the network element has data to send to the UE, then the network element transmits a paging message containing the DCID of the UE during a listening occasion of the UE. DL latency can be reduced compared to a conventional UE operating mode transition because the UE is not required to re-establish a connection to a network element. With reference to the message passing diagram 200 in FIG. 2, for example, the RRC connection setup procedure at 212 is not required in an embodiment in which the UE maintains a DCID and connection to the network. A DCID could also further reduce signaling overhead in embodiments in which the DCID is shorter than other identifiers, such as an International Mobile Equipment Identity (IMEI) or International Mobile Subscriber Identity (IMSI), used in existing paging processes.

In some embodiments, the UE also sends tracking information to a network element. A network element or other network component is able to track the location of the UE based on the tracking information. For example, the current location of a UE can be determined based on the network element(s) at which the tracking information is received. The tracking information could be a tracking sequence that is dedicated to the UE, for example. In an embodiment, the tracking sequence includes or is derived from the UE DCID, and a network element or component identifies the UE from which a tracking sequence is received based on the DCID of the UE. The tracking sequence could be a sequence that is used only for tracking UE location, or a sequence that is associated with the UE and is also used for other purposes.

Figure 4:
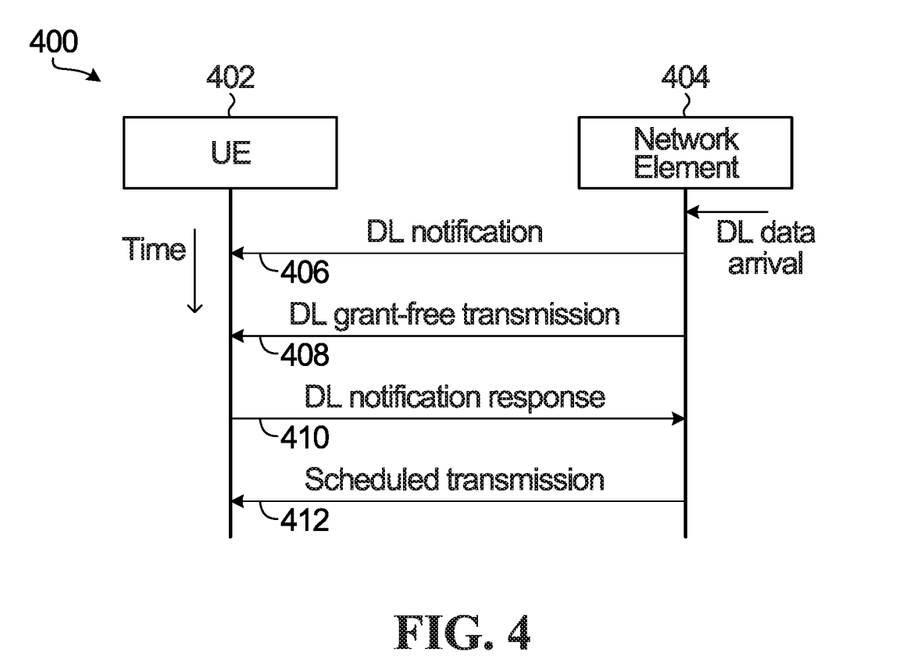
FIGS. 4 and 5 are message passing diagrams that illustrate signalling involved in standby-to-active UE operating mode transitions in accordance with embodiments.
Figure 5:
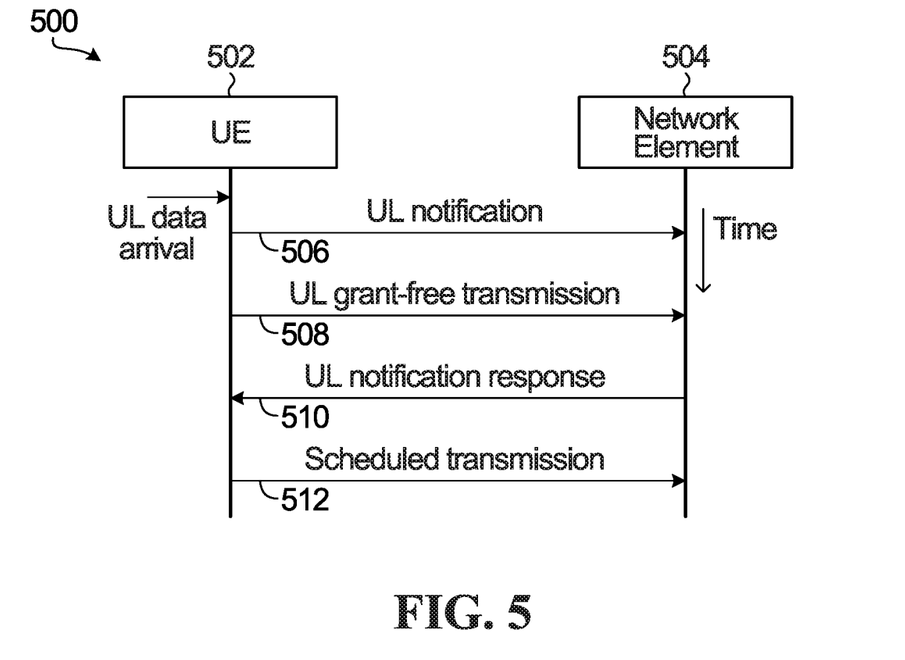

FIGS. 4 and 5 are message passing diagrams that illustrate signalling involved in standby-to-active UE operating mode transitions in accordance with embodiments. The message passing diagrams 400, 500 include UEs 402, 502 and network elements 404, 504. Although only one network element 404, 504 is shown in FIGS. 4 and 5, DL or UL transmissions could involve multiple network elements, such as an eNB 204, 304 and an MME 206, 306 (FIGS. 2 and 3).

In FIG. 4, when DL data arrives at the network element 404, the network element transmits a DL notification at 406, to notify the UE 402 that the network element has data to transmit to the UE. The UE 402, in response to the DL notification, transitions to the active operating mode. The network element 404 may also transmit all or part of the DL data in a grant-free transmission at 408. A grant-free transmission refers to a transmission from the network element 404 to the UE 402, or alternatively in the opposite direction from the UE to the network element, using communication resources for which an explicit grant of access to use those resources is not required. For example, the UE 402 may have periodic transmit opportunities during which the UE may transmit data on a grant-free communication channel, and the UE may also or instead monitor a grant-free communication channel for data that is transmitted by the network element to the UE. Grant-free data transmission is performed using predefined radio resources in an embodiment, and the data, resources, or both the data and resources for grant-free data transmission could be associated with and identified by the DCID of the UE.

The grant-free transmission at 408 is performed simultaneously with the DL notification at 406 in an embodiment. The network element 404 could also or instead transmit the DL data to the UE 402 in a scheduled transmission at 412. The scheduled transmission at 412 could be performed after a notification response is received from the UE 402 at 410, confirming to the network element 404 that the UE has transitioned to the active operating mode.

For DL transmissions in an LTE system that includes an MME and eNBs, for example, when DL data arrives at the MME, the MME transmits the DL data to an eNB that is providing service to the current tracked location of the UE. The eNB then transmits a DL notification to the UE, and may also transmit all or part of the DL data in a grant-free transmission. The eNB could also or instead use scheduled transmission to transmit the DL data to the UE after the UE transitions to the active operating mode.

With reference now to FIG. 5, when the UE 502 has UL data to be transmitted to the network element 504, the UE transmits a UL notification to the network element at 506. The UE may also transmit all or part of the UL data in a grant-free transmission at 508, simultaneously with the UL notification at 506 in an embodiment. A buffer status report could be transmitted with the UL notification at 506 or the grant-free transmission at 508. The UL grant-free transmission at 508 uses predefined radio resources in an embodiment, and the data, resources, or both the data and resources for the grant-free transmission could be associated with and identified by the DCID of the UE. The UE 502 uses scheduled transmission at 512 to transmit UL data after the network node 504 transmits resource grant signaling, also referred to herein as a resource grant, to the UE. In FIG. 5, the resource grant is included in a UL notification response at 510. Grant signaling could be separate from a UL notification response in other embodiments.

Figure 6:
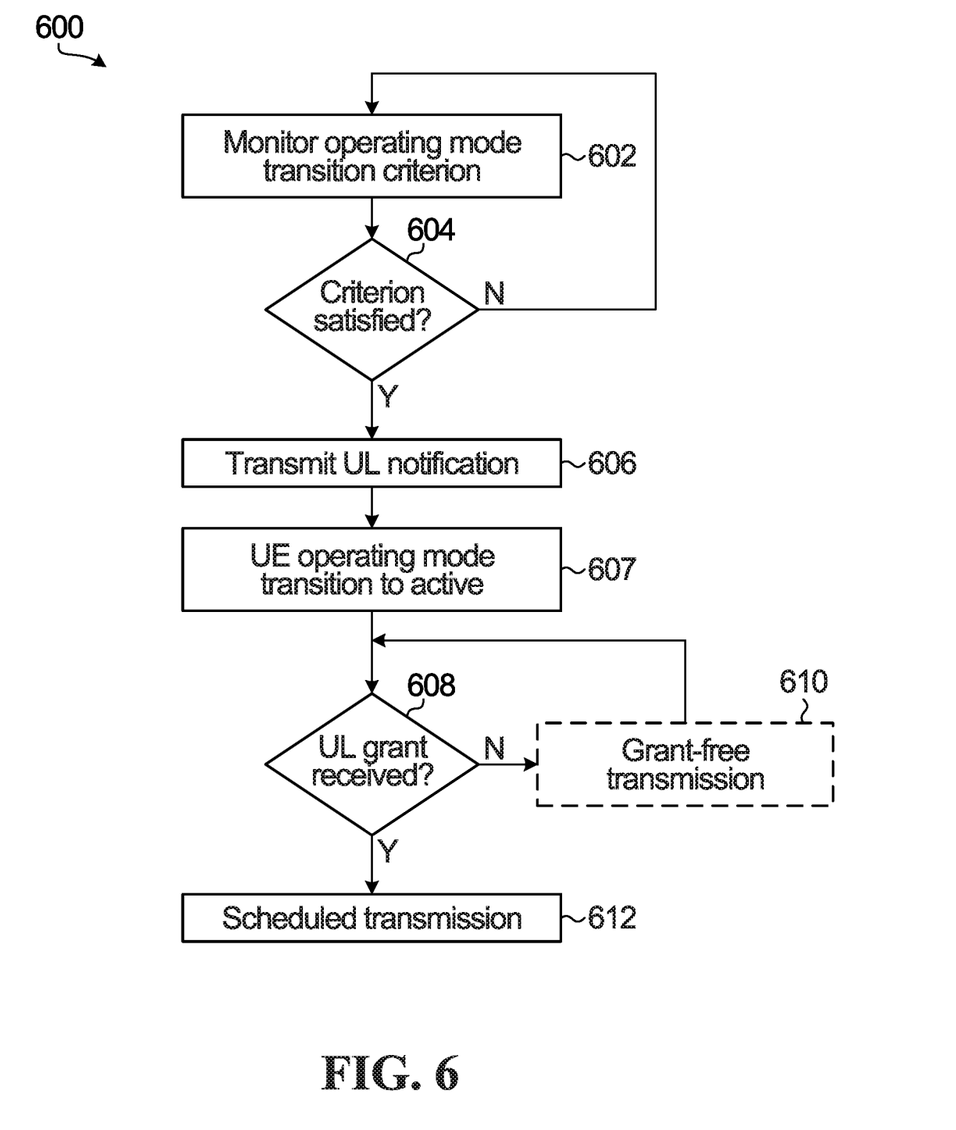
FIG. 6 is a flow diagram illustrating a method according to a further embodiment.

FIG. 6 is a flow diagram illustrating a method according to a further embodiment. The method 600 is illustrative of a method performed by a UE that is in a standby operating mode. At 602, the UE monitors an operating mode transition criterion. Multiple criteria could be monitored at 602. If an operating mode transition criterion is satisfied, as determined at 604, then a UL notification is transmitted to a network element at 606 in response to the criterion being satisfied, and the UE transitions to an active operating mode at 607, also in response to the criterion being satisfied. Otherwise, monitoring continues at 602.

The operating mode transition criterion could be an amount of data for transmission from the UE meeting or exceeding a threshold. One or more UE transmit buffers or queues could be monitored, for example, and the operating mode transition criterion is determined to be satisfied when an amount of data for transmission reaches or exceeds a threshold. In an embodiment, the threshold is based on a parameter of grant-free transmission, such as an amount of data that can be transmitted in a single grant-free uplink transmission or the maximum packet size for grant-free uplink transmission, for example. The threshold could be an amount of data that can be transmitted within a certain number of grant-free transmissions, for example. The threshold need not necessarily be a fixed threshold, and could be changed in accordance with network conditions. Another possible operating mode transition criterion is that the UE expects to receive an amount of data that will meet or exceed a threshold. For example, it could be useful for a UE to send the UL notification to a network element at 606 when, or shortly after, sending a request to download a file that is larger than a threshold size. The UL notification notifies the network element that the UE has or will be transitioning to the active operating mode, and the network element can then transmit the file to the UE without first sending a DL notification to the UE. In another embodiment, the UL notification notifies the network element that the UE is requesting to transition to the active operating mode, the network element responds in the notification response, at 510 in FIG. 5 for example, indicating or approving the transition, and the UE then transitions to the active operating mode. The network element can then transmit the file to the UE without first sending a DL notification to the UE.

The UL notification could include a pattern or sequence (e.g. Zadoff-Chu sequence, Pseudo-Noise (PN) sequence) that was previously transmitted by the UE. The transmitting at 606 could involve transmitting the same sequence using different communication resources than those used for the previous transmission. For example, a tracking sequence could be re-used as the UL notification but transmitted using different time-frequency resources than those that are normally used to transmit the tracking sequence. Thus, re-use of a tracking sequence as a UL notification involves transmitting a sequence using communication resources that are different from those normally used to transmit that sequence.

In another embodiment, the UL notification includes a sequence that is transmitted using communication resources that were previously used by the UE to transmit a different sequence. A tracking channel that is normally used by the UE to transmit tracking information could be re-used to transmit a sequence that is different from a tracking sequence, for example. Such re-use of a tracking channel to transmit a UL notification involves using communication resources, which are normally used to transmit a first sequence, to instead transmit a second sequence that is different from the first sequence.

The UL notification need not necessarily be separate from a grant-free transmission. For example, the UL notification could be a UE buffer status report that is transmitted in a grant-free transmission at 606, as an implicit notification to the network element. A buffer status report, or other form of the UL notification, could be included in a grant-free transmission by a UE that is in the standby operating mode. The UE could transition to the active operating mode before or after the UL notification is transmitted.

The UL notification could include an explicit indication that an operating mode transition criterion is satisfied. In some embodiments, the UL notification includes information identifying which one of multiple monitored criteria is satisfied.

At 608, the UE determines whether a resource grant is received from the network element. Before receiving the UL resource grant information, the UE may transmit UL data in a grant-free transmission, as shown at 610. For example, if the operating mode transition criterion that triggered the UL notification to be sent at 606 is related to a quantity of data to be sent in UL, all or part of that data could be transmitted in a grant-free transmission at 610. Although grant-free transmission is shown only once at 510 in FIG. 5, there could be multiple grant-free transmissions. For example, the UE could transmit UL data in a grant-free transmission simultaneously with transmitting the UL notification at 606, and also or instead transmit UL data in one or more grant-free transmissions at 610. Scheduled transmission of data to the network element is performed at 612, after receiving a resource grant from the network element.

The example method 600 is illustrative of one embodiment. Other embodiments could include different or additional operations. The order in which operations are performed could also be similar to or different from the order shown in FIG. 6. Examples of additional operations that may be performed, and/or various ways to perform the illustrated operations, may be or become apparent.

For instance, any of various communication channel properties could be measured by the UE and transmitted to a network element. Channel State Information (CSI) reports could be used by the network element, or another network component, to implement an adaptive communication scheme, for example. CSI measurement and reporting could be performed simultaneously with transmitting the UL notification at 606, and/or before or after receiving resource grant information from the network element.

Figure 7:
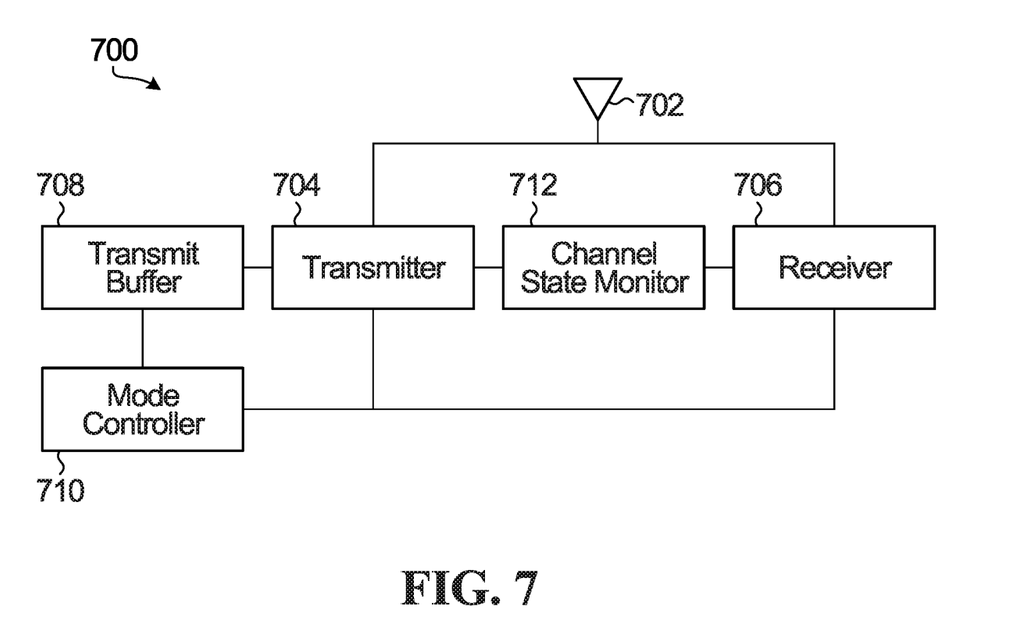
FIG. 7 is a block diagram illustrating a UE according to an embodiment.

FIG. 7 is a block diagram illustrating a UE 700 according to an embodiment. The example UE 700 includes an antenna 702, a transmitter 704 and a receiver 706 coupled to the antenna, a transmit buffer 708 coupled to the transmitter, a mode controller 710 coupled to the transmit buffer, the transmitter, and the receiver, and a channel state monitor 712 coupled to the transmitter and the receiver.

Although a single antenna 702 is shown in FIG. 7, a UE could include multiple antennas. Separate receive and transmit antennas or sets of multiple antennas could be provided at 702, or the same antenna or set of multiple antennas could be used for both receiving and transmitting communication signals. The antenna 702 could include one or more antennas of any of various types. The type of the antenna, or each antenna, provided at 702 could be implementation-specific.

The transmit buffer 708 could similarly include multiple buffers or multiple memory devices of the same or different types. Solid-state memory devices or memory devices with movable or removable storage media could be used to implement the transmit buffer 708. Other examples of memory devices are also described above. The memory device or devices used to implement the transmit buffer 708 need not be dedicated only to the transmit buffer, and could be used to store data or information other than data that is to be transmitted from the UE 700.

In general, hardware, firmware, components which execute software, or some combination thereof might be used in implementing the transmitter 704, the receiver 706, the mode controller 710, and the channel state monitor 712. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Software that may be used in operation of the UE 700 could be stored in one or more physical memory devices, such as a memory device or memory devices in which storage space for the transmit buffer 708 is provided. Memory devices could instead be internal to one or more of the components shown in FIG. 7. External memory devices operatively coupled to the illustrated components, or to one or more processors that implement those components, are also possible.

The transmitter 704 could perform such operations as frequency up-conversion and modulation, and the receiver 706 could perform inverse operations, including frequency down-conversion and demodulation. The transmitter 704 and the receiver 706 could perform other operations instead of or in addition to these example operations, depending on the specific implementation and the types of communication functions and protocols to be supported. The transmitter 704 and the receiver 706 are operative transmit communication signals to and receive communication signals from one or more network elements a communication network.

In an embodiment, the transmitter 704 is operative to transmit to a network element a notification in response to an operating mode transition criterion for the UE 700 being satisfied. The mode controller 710 is operative to transition the UE 700 from a standby operating mode to an active operating mode, also in response to the operating mode transition criterion being satisfied. This mode transition could be performed, for example, by providing commands or other types of control signals to UE components. An operating mode transition could also or instead involve controlling power to UE components, such as components of the transmitter 704 and the receiver 706, which have been powered down to conserve power in the standby operating mode of the UE 700. In some embodiments, mode transition involves reconfiguring UE components for which configurations had been changed to transition the UE 700 from the active operating mode to the standby operating mode.

The mode controller 710 could also determine whether the mode transition criterion is satisfied. This involves monitoring a fill level of the transmit buffer 708 in an embodiment. Examples of mode transition criteria are described above.

Transmission of the notification by the transmitter 704 involves the transmitter and the antenna 702. Although the notification is transmitted by the transmitter 704, transmission of the notification could be under control of the mode controller 710. For example, the mode controller 710 could send a command or otherwise control the transmitter 704 to transmit the notification. The notification could be generated by the mode controller 710 and provided to the transmitter 704, or generated and transmitted by the transmitter. Examples of notifications are also described above.

Grant-free data transmissions and scheduled transmissions could similarly be handled by the transmitter 704, possibly under control of the mode controller 710 or one or more other components of the UE 700. In the example UE 700, mode controller 710 could detect receipt of a resource grant from a network node by the receiver 706, and control the transmitter 704 to transition to scheduled transmission. The transmitter 704 could also perform a grant-free transmission simultaneously with transmitting the notification, and also or instead perform one or more grant-free transmissions before a resource grant is received.

The channel state monitor 712 is coupled to the receiver, and is operative to measure or otherwise monitor communication channel state at the UE 700. The transmitter 704 is further configured to transmit a CSI report, including channel state information in accordance with the measured communication channel state, to the network element.

Figure 8:
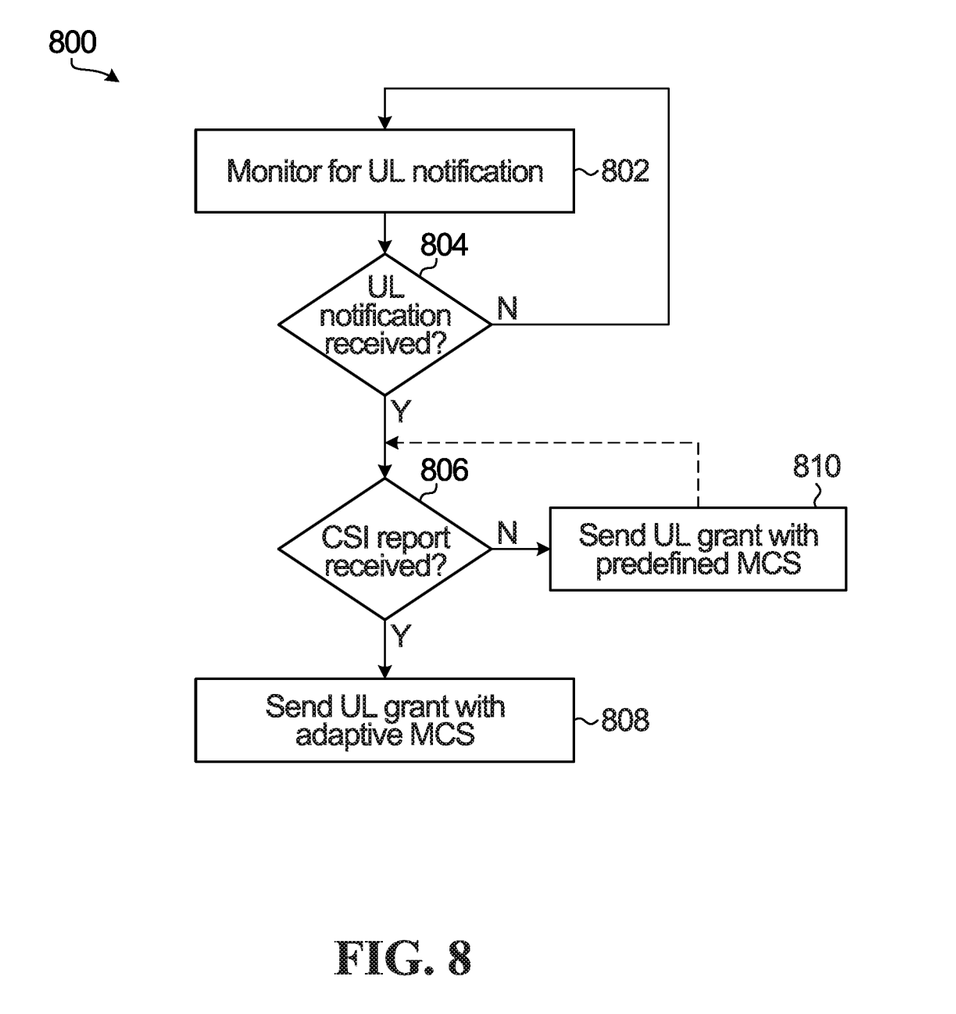
FIGS. 8 and 9 are flow diagrams illustrating methods according to further embodiments.
Figure 9:
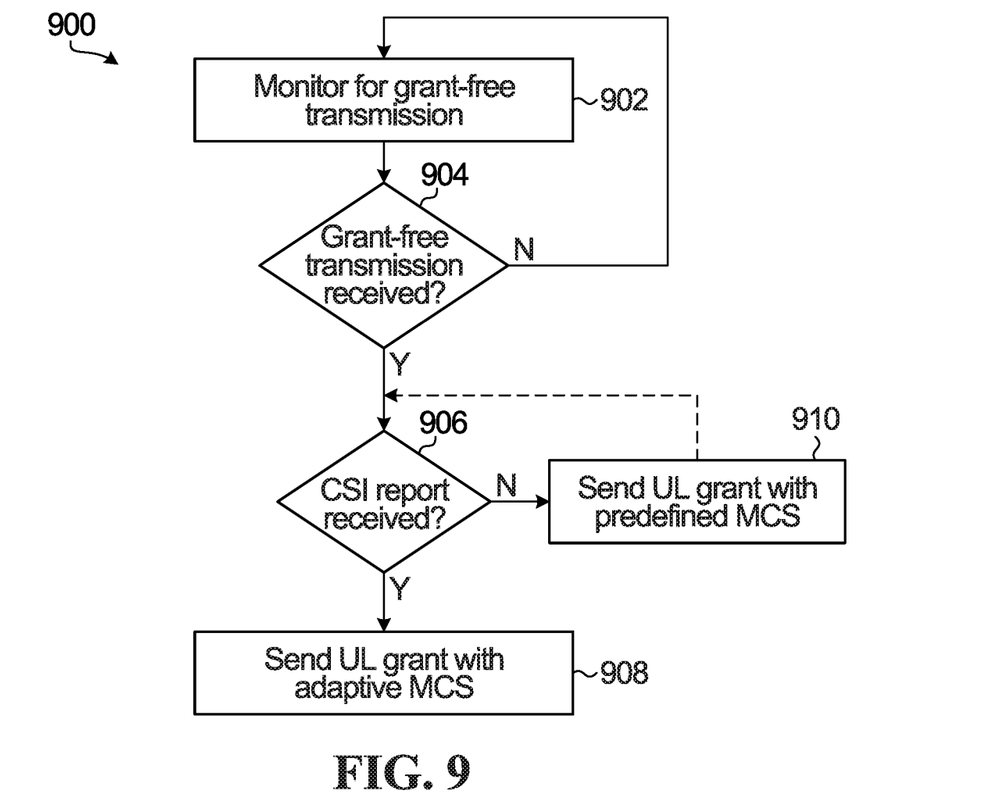

FIGS. 8 and 9 are flow diagrams illustrating methods according to further embodiments. The example methods 800, 900 are illustrative of methods performed by network equipment, such as a network element.

In the example method 800, at 802 the network element monitors for receipt of a UL notification from a UE, indicating that an operating mode transition criterion for transitioning the UE from a standby operating mode to an active operating mode is satisfied. Until a UL notification is received, monitoring continues at 802. After a UL notification is received, as determined at 804, the network element transmits to the UE a grant of communication resources for use by the UE in transmitting data to the network element. In another embodiment, in addition to transmitting a grant, the network element also indicates to the UE that the UE is to transition to the active operating mode.

In the embodiment shown, the network element determines, at 806, whether a CSI report is received from the UE. A resource grant could be transmitted to the UE at 810 without first receiving a CSI report. The network element could then continue to check for receipt of a CSI report from the UE at 806, even after grant information has been transmitted to the UE. For example, without a CSI report from the UE, the network element could transmit grant signaling that specifies a predefined Modulation and Coding Scheme (MCS). When a CSI report is received from the UE, however, the grant of resources could be based on CSI information in accordance with an adaptive communication scheme, such as an adaptive MCS as shown at 808, for example. In another embodiment, the resource grant is not transmitted to the UE until it is determined at 808 that a CSI report has been received from the UE.

The example method 900 in FIG. 9 involves monitoring for receipt of a grant-free transmission from a UE at 902. The operations at 906, 908, 910 are similar to the operations 806, 808, 810 of FIG. 8, and are performed when it is determined at 904 that a grant-free transmission that includes data from the UE has been received. A grant-free transmission from the UE is one form of an implicit UL notification from a UE indicating that the UE has transitioned or will be transitioning from a standby operating mode to an active operating mode. The example method 900 is otherwise similar to the example method 800.

The example methods 800, 900 are illustrative of embodiments. Other embodiments could include different or additional operations. The order in which operations are performed could also be similar to or different from the order shown in FIG. 6. Examples of additional operations that may be performed, and/or various ways to perform the illustrated operations, may be or become apparent.

Figure 10:
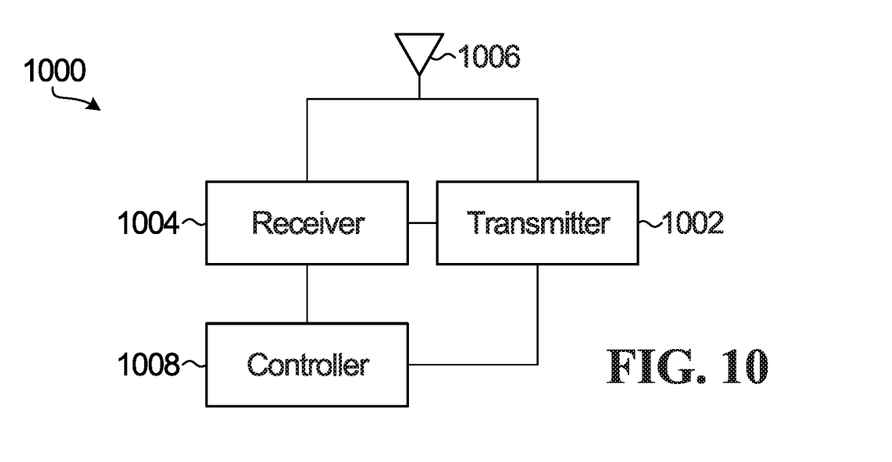
FIG. 10 is a block diagram illustrating a network element according to another embodiment.

FIG. 10 is a block diagram illustrating a network element according to a further embodiment. The example network element 1000 includes a transmitter 1002 and a receiver 1004 coupled to one or more antennas at 1006, and a controller 1008 coupled to the transmitter and the receiver. Hardware, firmware, components that execute software, or some combination thereof might be used in implementing at least the transmitter 1002, the receiver 1004, and the controller 1008. Examples of hardware, firmware, and components that execute software are described above. The antenna shown at 1006 could include separate receive and transmit antennas or sets of antennas, or the same antenna or sets of antennas could be used for both transmitting and receiving communication signals. The antenna 1006 is compatible with the UE antenna 702 (FIG. 7), to enable communications between the network element 1000 and UEs. A network element may include other components, such as one or more interfaces to other network equipment, for example.

The receiver 1004 is operative to receive a notification from a UE that an operating mode transition criterion for transitioning the UE from a standby operating mode to an active operating mode is satisfied. The transmitter 1002 is operative to transmit to the UE a grant of communication resources for use by the UE in transmitting data to the network element 1000. Examples of notifications and resource grants are described above.

Although communication signals are transmitted and received through the transmitter 1002, the receiver 1004, and the antenna 1006, operation of the transmitter and the receiver may be under control of the controller 1008. For example, the controller 1008 could be operative to determine that the notification has been received from the UE, and to command or otherwise control the transmitter 1002 to transmit the resource grant to the UE.

Examples of additional operations that may be performed by the transmitter 1002, the receiver 1004, or the controller 1006, as well as various ways to perform such operations, are described above. The receiver 1004 could also receive a CSI report from the UE, for example, and the controller 1008 could then control the resource grant in accordance with an adaptive communication scheme, such as an adaptive MCS.

The foregoing description relates primarily to UL embodiments involving transmission of notifications and data from UEs to network elements. However, other embodiments relate to DL communications as well.

Transmitting data in a grant-free transmission at the same time as transmitting a UL or DL notification can significantly reduce latency. As noted above, the procedures shown in FIGS. 2 and 3 introduce latency in transmitting DL data or UL data. The grant-free transmissions at 408, 508 in FIGS. 4 and 5 may be performed simultaneously with transmission of the notifications at 406, 506. If the grant-free and notification transmissions use different communication resources, then these transmissions may at least partially overlap in time. These transmissions could instead be performed at different times and still be completed in less time than it would take to complete a reconnection procedure, such as the RRC connection setup procedure at 212 (FIG. 2) or the RRC connection setup procedure at 308, the S1 setup procedure at 310, and the RRC reconfiguration procedure at 312 (FIG. 3).

In accordance with another embodiment, a method involves transmitting, between a UE and a network element, a notification regarding a transition of the UE from a standby operating mode to an active operating mode in response to data that is to be transmitted between the UE and the network element, and transmitting all or part of the data in a grant-free transmission between the UE and the network element before a response to the notification is received. The notification and data could be transmitted from the UE to the network element, or from the network element to the UE.

UE to network element notifications and data transmission are described in detail above. For network element to UE notifications and data transmission, the DL notification can also be considered an example of a notification regarding a transition of the UE from a standby operating mode to an active operating mode. A DL notification causes the UE to transition from the standby operating mode to the active operating mode, and in this sense it is a notification regarding the UE transition between operating modes.

As shown in FIGS. 7 and 10, a UE or network element could include an antenna 702, 1006 and a transmitter 704, 1002 coupled to the antenna. In an embodiment, the transmitter 704, 1002 is operative to transmit, between a UE and a network element, a notification regarding a transition of the UE from a standby operating mode to an active operating mode, and to transmit data in a grant-free transmission between the UE and the network element before a response to the notification is received.

What has been described is merely illustrative of the application of principles of embodiments of the present disclosure. Other arrangements and methods can be implemented by those skilled in the art.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in FIGS. 4 to 10 are also intended solely for illustrative purposes.

Other implementation details could also vary between different embodiments. For example, some of the examples above refer to LTE terminology. However, the embodiments disclosed herein are not in any way limited to LTE systems. RRC idle mode is an example of a standby operating mode in LTE systems. Standby operating modes in other types of systems include Sleep mode and DRX (Discontinuous reception) mode, for instance.

In addition, although described primarily in the context of methods and systems, other implementations are also contemplated, as instructions stored on a non-transitory processor-readable medium, for example. The instructions, when executed by one or more processors, cause the one or more processors to perform a method.

What is claimed is:

1. A method performed by a user equipment (UE), the method comprising:
   transmitting, by the UE in a standby operating mode, to a network element in a communication network, an uplink grant-free transmission of data and a notification, the notification indicating a UE mode transition from the standby operating mode to an active operating mode, the uplink grant-free transmission being a transmission without an explicit grant of access to use communication resources; and
   after the transmitting, transitioning, by the UE, from the standby operating mode to the active operating mode.

2. The method of claim 1, further comprising:
receiving, by the UE in the active operating mode, a notification response from the network element.

3. The method of claim 2, wherein the transitioning from the standby operating mode to the active operating mode is in response to an operating mode transition criterion being satisfied, the operating mode transition criterion being associated with data that is to be transmitted by the UE.

4. The method of claim 3, further comprising:
determining whether the operating mode transition criterion is satisfied.

5. The method of claim 3, wherein the operating mode transition criterion comprises an amount of data for transmission from the UE meeting or exceeding a threshold.

6. The method of claim 5, wherein the threshold is based on a parameter of grant-free uplink transmission.

7. The method of claim 5, wherein the threshold is based on an amount of data that can be transmitted from the UE in a single grant-free uplink transmission.

8. The method of claim 3, wherein the operating mode transition criterion comprises an amount of data expected to be received by the UE meeting or exceeding a threshold.

9. The method of claim 1, wherein the notification comprises a sequence that was previously transmitted by the UE using first communication resources, and wherein transmitting the notification comprises transmitting the sequence using second communication resources which are different from the first communication resources.

10. The method of claim 1, wherein the notification comprises a first sequence, and wherein transmitting the notification comprises transmitting the first sequence using communication resources that were previously used by the UE to transmit a second sequence that is different from the first sequence.

11. The method of claim 1, wherein the notification comprises a UE data buffer status report, and wherein transmitting the notification comprises transmitting the UE data buffer status report in a grant-free transmission to the network element.

12. The method of claim 1, wherein transmitting the notification comprises transmitting the notification to the network element in a grant-free transmission when the UE is in the standby operating mode.

13. The method of claim 1, wherein the data, the communication resources that are used for the uplink grant-free transmission, or both the data and the communication resources that are used for the uplink grant-free transmission are associated with an identifier of the UE.

14. The method of claim 1, further comprising:
performing scheduled transmission of data to the network element after receiving a grant of communication resources from the network element.

15. The method of claim 1, further comprising:
transmitting Channel State Information (CSI) to the network element.

16. A non-transitory processor-readable medium storing instructions, when executed by one or more processors, cause the one or more processors to perform a method comprising:
transmitting a notification from a user equipment (UE) to a network element in a communication network in response to an operating mode transition criterion for the UE being satisfied; and
transitioning the UE from a standby operating mode to an active operating mode in response to the operating mode transition criterion being satisfied.

17. A User Equipment (UE) comprising:
a transmitter to transmit, while the UE is in a standby operating mode, an uplink grant-free transmission of data and a notification, to a network element in a communication network, the notification indicating a UE mode transition from the standby operating mode to an active operating mode, the uplink grant-free transmission being a transmission without an explicit grant of access to use communication resources; and
a mode controller, coupled to the transmitter, to transition the UE from the standby operating mode to the active operating mode after transmitting the uplink grant-free transmission of data and the notification.

18. The UE of claim 17, wherein the transmitter is further configured to receive, while the UE is in the active operating mode, a notification response from the network element.

19. The UE of claim 17, wherein the mode controller is further configured to determine whether an operating mode transition criterion is satisfied and transition the UE from the standby operating mode to the active operating mode in response to the operating mode transition criterion being satisfied, the operating mode transition criterion being associated with data that is to be transmitted by the UE.

20. The UE of claim 19, wherein the operating mode transition criterion comprises an amount of data expected to be received by the UE meeting or exceeding a threshold.

21. The UE of claim 19, wherein the operating mode transition criterion comprises an amount of data for transmission from the UE meeting or exceeding a threshold.

22. The UE of claim 17, wherein the transmitter is configured to transmit the notification in a grant-free transmission when the UE is in the standby operating mode.

23. The UE of claim 17, wherein the transmitter is further configured to perform scheduled transmission of data to the network element after receiving a grant of communication resources from the network element.

24. The UE of claim 17, further comprising:
a channel state monitor, coupled to the transmitter, to measure a communication channel state at the UE,
wherein the transmitter is further configured to transmit Channel State Information (CSI), in accordance with the measured communication channel state, to the network element.

* * * * *